(12) United States Patent
Jia et al.

(10) Patent No.: US 10,640,176 B1
(45) Date of Patent: May 5, 2020

(54) OBSERVATION SYSTEM AND METHOD FOR RE-SUSPENSION QUANTITY OF SUBMARINE SEDIMENTS BY DEEP-SEA INTERNAL WAVES

(71) Applicant: Ocean University of China, Qingdao (CN)

(72) Inventors: Yonggang Jia, Qingdao (CN); Zhuangcai Tian, Qingdao (CN); Shaotong Zhang, Qingdao (CN); Bowen Zhang, Qingdao (CN); Zhiming Wei, Qingdao (CN); Xiaolei Liu, Qingdao (CN); Hongxian Shan, Qingdao (CN)

(73) Assignee: OCEAN UNIVERSITY OF CHINA, Qingdao (CN)

( * ) Notice: Subject to any disclaimer, the term of this patent is extended or adjusted under 35 U.S.C. 154(b) by 0 days.

(21) Appl. No.: 16/495,828

(22) PCT Filed: Dec. 20, 2018

(86) PCT No.: PCT/CN2018/122246
§ 371 (c)(1),
(2) Date: Sep. 19, 2019

(87) PCT Pub. No.: WO2019/141038
PCT Pub. Date: Jul. 25, 2019

(30) Foreign Application Priority Data

Jan. 22, 2018 (CN) .......................... 2018 1 0061172

(51) Int. Cl.
*B63B 21/50* (2006.01)
*G01C 13/00* (2006.01)

(52) U.S. Cl.
CPC .............. *B63B 21/50* (2013.01); *G01C 13/00* (2013.01); *B63B 2211/02* (2013.01)

(58) Field of Classification Search
CPC ...... B63B 21/50; B63B 2211/02; G01C 13/00
See application file for complete search history.

(56) References Cited

U.S. PATENT DOCUMENTS

2015/0116496 A1* 4/2015 Ottaviano .............. H04N 7/185
348/148
2015/0274261 A1* 10/2015 Bauer ..................... B63B 21/26
701/21

FOREIGN PATENT DOCUMENTS

CN         202092644 U    12/2011
CN         103411639 A    11/2013
(Continued)

*Primary Examiner* — David Z Huang
(74) *Attorney, Agent, or Firm* — Bayramoglu Law Offices LLC

(57) ABSTRACT

An observation system and determination method for the re-suspension quantity of submarine sediments by deep-sea internal waves. The observation system comprises a submarine observation platform, a mooring rope, and an anchor mooring counterweight. Acoustic release transponder, a single-point current meter, a turbidity meter, a high-precision temperature and salinity detector, and a sediment catcher are mounted on the submarine observation platform. A main floating body and auxiliary floating bodies are arranged on the mooring rope, wherein the main floating body is located in the middle of the mooring rope and is equipped with acoustic Doppler current profilers, and the auxiliary floating bodies are equipped with turbidity meters and high-precision temperature and salinity detectors. The anchor mooring counterweight is a gravity anchor provided with a square clamping groove and a fixed ring.

3 Claims, 3 Drawing Sheets

(56) References Cited

FOREIGN PATENT DOCUMENTS

| | | | |
|---|---|---|---|
| CN | 104875849 | A | 9/2015 |
| CN | 107218931 | A | 9/2017 |
| CN | 108267126 | A | 7/2018 |

* cited by examiner

OBSERVATION SYSTEM AND METHOD FOR RE-SUSPENSION QUANTITY OF SUBMARINE SEDIMENTS BY DEEP-SEA INTERNAL WAVES

CROSS REFERENCE TO THE RELATED APPLICATIONS

This application is the national phase entry of International Application No. PCT/CN2018/122246, filed on Dec. 20, 2018, which is based upon and claims priority to Chinese Patent Application No. 201810061172.8, filed on Jan. 22, 2018, the entire contents of which are incorporated herein by reference.

TECHNICAL FIELD

The invention relates to the technical field of ocean observation and the field of marine engineering geology, in particular to an observation system and method for the re-suspension quantity of submarine sediments by deep-sea internal waves.

BACKGROUND

With the exploration and development of marine resources in China, the vast deep seabed having rich natural resources and a special political status is becoming a strategic region drawing the attention from various countries in the world, particularly in the aspect of study on complex deep seas. The limited data obtained through various traditional techniques lead to more difficult observation of the deep-water environment, which in turn results in a confined recognition of people about the multi-scale changing process of deep oceans, and the predication of future development is restricted. In view of this, it appears to be particularly important to acquire full-depth in-situ comprehensive observation data of oceans, particularly large-depth near-bottom observation data.

Ocean internal waves are generated between water layers with inconsistent densities in the oceans, extend along the full depth of the oceans, have the characteristics of large amplitude, high flow rate and high propagation velocity, and are extensively distributed in oceans around the world, particularly in South China Sea. The internal waves may induce powerful vertical flows which in turn cause migration of sediments and pollutants, thus, having a great influence on the marine environment and gaining more and more attention from people. The suspension of submarine sediments by internal waves has been observed in various sea areas, and huge submarine nepheloid layers are formed.

Traditional marine in-situ observation platforms mainly consist of a submersible buoy and a seabed station. Observation devices carried by the submersible buoy are fax away from the seabed and thus cannot observe near-bottom marine parameters. Although the seabed station can fulfill near-bottom observation of the seabed, the landing attitude of the seabed station cannot be guaranteed when the seabed station is launched to the seabed, and once the seabed station topples or is trapped in mud, it cannot be recovered easily; and more importantly, due to the poor loading capacity of the traditional seabed station, only near-bottom ocean dynamic parameters can be observed, while full-depth observation of oceans cannot be fulfilled. In order to realize full-depth comprehensive observation of oceans, two or more observation platforms have to be used, which leads to complex operation and poor safety; and data of the multiple observation platforms need to be transmitted to one station to be corrected. Therefore; a comprehensive observation system is in urgent need nowadays to realize observation of the whole space of deep oceans to gain a more comprehensive and deeper recognition of the effect of ocean dynamics on submarine sediments. The submarine sediments are generally observed by means of optical and acoustic instruments which can only reflect the suspension concentration and cannot figure out quantitative parameters. The invention aims to fill this blank to realize full-depth observation of the suspension of the submarine sediments by ocean internal waves from the seabed to the sea surface and to accurately determine the suspension quantity of the submarine sediments, thereby facilitating the prediction of erosion of ocean internal waves to the seabed.

SUMMARY

The objective of the invention is to provide an observation system and method for the re-suspension quantity of submarine sediments by deep-sea internal waves to realize synchronous observation of full-depth environmental parameters of oceans. By adoption of the observation system and method, profile data of internal waves and turbidity of an upper layer of oceans can also be obtained besides the temperature, salinity, pressure, three-dimensional flow rate and turbidity of a near-bottom layer.

An observation system for the re-suspension quantity of submarine sediments by deep-sea internal waves comprises a submarine observation platform frame located at the bottom of the system, an anchor mooring counterweight located below the submarine observation platform frame, and a mooring rope arranged vertically, wherein the anchor mooring counterweight is a cuboid gravity anchor provided with a fixed ring in the middle of the upper surface, and floating materials are arranged at the top of the submarine observation platform frame; the submarine observation platform frame is equipped with a turbidity meter, a sediment catcher, a high-precision temperature and salinity detector, a single-point current meter, and two acoustic release transponders connected in parallel; the upper ends of the two acoustic release transponders are connected with the submarine observation platform frame, and the lower ends of the two acoustic release transponders are connected through a rope penetrating through the fixed ring; the mooring rope has a bottom end connected with the submarine observation platform frame and a top end connected with a first glass floating ball assembly; a second glass floating ball assembly, a release ring and a main floating body are sequentially arranged on the mooring rope from the bottom end to the first glass floating ball assembly at the top end; two or more auxiliary floating bodies are mounted at different positions of the mooring rope; the main floating body is located in the middle of the mooring rope and is equipped with the two acoustic Doppler current profilers, wherein one of the two acoustic Doppler current profilers faces upwards and is used for observing a flow field above the main floating body, and the other one of the two acoustic Doppler current profilers faces downwards and is used for observing a flow field below the main floating body, so that full-depth flow measurement from the sea surface to the seabed is achieved; and each auxiliary floating body is equipped with a turbidity meter and a high-precision temperature and salinity detector.

A plurality of auxiliary floating bodies are arranged on the upper portion of the mooring rope, wherein the number of the auxiliary floating bodies is set as needed, the auxiliary floating bodies are arrayed at equal intervals, and the distance between the adjacent auxiliary floating bodies is not over 20 m; and a first glass floating ball assembly and a second glass floating ball assembly are respectively arranged at the top end and a lower portion of the mooring rope, and a release ring is arranged on the mooring rope and is located above the second glass floating ball assembly. The release ring is located above the second glass floating ball assembly and can emerge from seawater when recovered, so that the submarine observation platform can be released and withdrawn conveniently.

The submarine observation platform is settled on the seabed for observation, comprises a modular frame structure formed by light corrosion-resistant metal pipes through welding, and can be disassembled and assembled freely according to the technical requirements for deep seabed observation.

The submarine observation platform frame has an upper portion in a quadrangular conical shape and a lower portion in a cuboid shape, and floating materials are fixed to the upper portion of the submarine observation platform frame to guarantee the descending attitude of the observation system.

The anchor mooring counterweight is a cuboid gravity anchor matched with the submarine observation platform, a fixed ring is arranged in the middle of the gravity anchor and is connected with the acoustic release transponders, the gravity anchor is inlaid in the submarine observation platform through a square clamping groove and is automatically separated from the submarine observation platform when the observation system is released, and the lower end of the two acoustic release transponders are connected through a rope penetrating through the fixed ring.

A method for Obtaining the re-suspension quantity of submarine sediments by deep-sea internal waves through the observation system comprises the following steps:

(1) Calibrating the instruments on the observation system, and setting operating parameters of the instruments;

(2) Transporting the observation system to a target position by an auxiliary vessel and a GPS positioning system, preparing a hoisting device and a deployment rope on the vessel, configuring the mooring rope and the instruments fixed on the mooring rope, and then launching the submarine observation platform frame through the release ring 15;

(3) After configuration is completed, carrying out self-contained observation by the instruments on the observation system according to the set parameters;

(4) After observation is completed, withdrawing the observation system by the auxiliary vessel particularly as follows: the anchor mooring counterweight is released through the two acoustic release transponders connected in parallel, so that the submarine observation platform frame is separated from the anchor mooring counterweight; the rope located at the bottom ends of the two acoustic release transponders penetrates through the fixed ring at the top of the anchor mooring counterweight, so that release and separation can be completed as long as one acoustic release transponder works normally, the whole mooring rope and the submarine observation platform frame emerge from seawater under the effect of the floating bodies; afterwards, the submarine observation platform frame emerging from the seawater is withdrawn through the release ring; and finally, the mooring rope and the instruments fixed to the mooring rope are recovered;

(5) Reading data in the self-contained instruments, and collecting suspended solids caught by the sediment catcher;

(6) Removing organic components in part of the suspended solids caught by the sediment catcher with H2O2, and calculating the percentage of sediments in all the suspended solids according to the following formula:

$$f = \frac{m_s}{m}$$

Wherein, f is the percentage of the sediments in the suspended solids, ms is the mass of the suspended solids after the organic components are removed, and m is the total mass of the suspended solids;

Afterwards, determining the granularity of remaining sediments through a Malvin granulometer, and finally, preparing a suspension with the remaining sediments to calibrate the turbidity meters, so that the suspended solid concentration is obtained according to turbidity data;

(7) Determining internal waves by an analysis of flow rate data and temperature-salinity profile data;

(8) Determining the re-suspension quantity of the sediments by the internal waves according to a calibration result obtained in Step 6 and the internal waves obtained in Step 7;

The re-suspension quantity is calculated according to the following formula:

$$T = f\left[\int_0^{L1}(ssc_1 \times u_1) + \int_{L1}^{L2}(ssc_2 \times u_2) + \int_{L2}^{L3}(ssc_3 \times u_3) + \ldots + \int_{Ln-1}^{Ln}(ssc_n \times u_n)\right]$$

Wherein, T is the re-suspension quantity of the sediments by the internal waves, and f is the percentage of the sediments in all the suspended solids; if the observation system is equipped with n−1 auxiliary floating bodies each comprising one turbidity meter and the submarine platform is provided with one turbidity meter, totally n turbidity meters are configured and are sequentially marked as a 1st turbidity meter, a 2nd turbidity meter and an nth turbidity meter from bottom to top; L1, L2; . . . , and Ln are the heights of the turbidity meters relative to the seabed, and SSC is the suspended solid concentration and is the calibration result obtain in Step 6; due to the fact that multiple auxiliary floating bodies are arranged, data of the suspended solid concentration at the positions of the auxiliary floating bodies are obtained, and the SSC in height areas of the auxiliary floating bodies is estimated according to the data of the suspended solid concentration at different heights, wherein SSC1 is the average suspended solid concentration from the seabed to the 1st turbidity meter; SSC2 is the average suspended solid concentration from the 1st turbidity meter to the 2nd turbidity meter, . . . , and so on; and u1 is a flow field measured by the acoustic Doppler current profilers at the height corresponding to SSC1, u2 is a flow field measured by the acoustic Doppler current profilers at the height corresponding to SSC2; . . . , and so on.

The observation system can be settled on the seabed of a deep sea safely and steadily to achieve full-depth observation of ocean dynamic environmental parameters from the seabed to the sea surface and to determine the re-suspension quantity of sediments by internal waves. Near-bottom ocean dynamic environmental parameters can be measured through the submarine observation platform equipped with various instruments, ocean dynamic changes of the upper layer can be observed through instruments arranged on the mooring rope, and the two parts constitute an ocean full-depth comprehensive observation system which fulfills a deeper recognition of the influence of internal waves on ocean dynamic environmental changes, can quantitatively analyze the suspension quantity of the sediments by the internal waves; conforms to the development trend of future ocean observation, and has good market prospects.

BRIEF DESCRIPTION OF THE DRAWINGS

FIG. 2 is a schematic diagram of an anchor mooring counterweight, wherein FIG. 2a is a top view, and FIG. 2b is a front view;

In the figures: 1, anchor mooring counterweight; 2, submarine observation platform frame; 3, acoustic release transponder; 4, turbidity meter; 5, sediment catcher; 6, high-precision temperature and salinity detector; 7, single-point current meter; 8, floating material; 9, second glass floating ball assembly; 10, mooring rope; 11, main floating body; 12, acoustic Doppler current profiler; 13, auxiliary floating body; 14, first glass floating ball assembly; 15, release ring; 16, fixed ring; 15, square clamping groove; 18, rope.

DETAILED DESCRIPTION OF THE EMBODIMENTS

Figure 1:
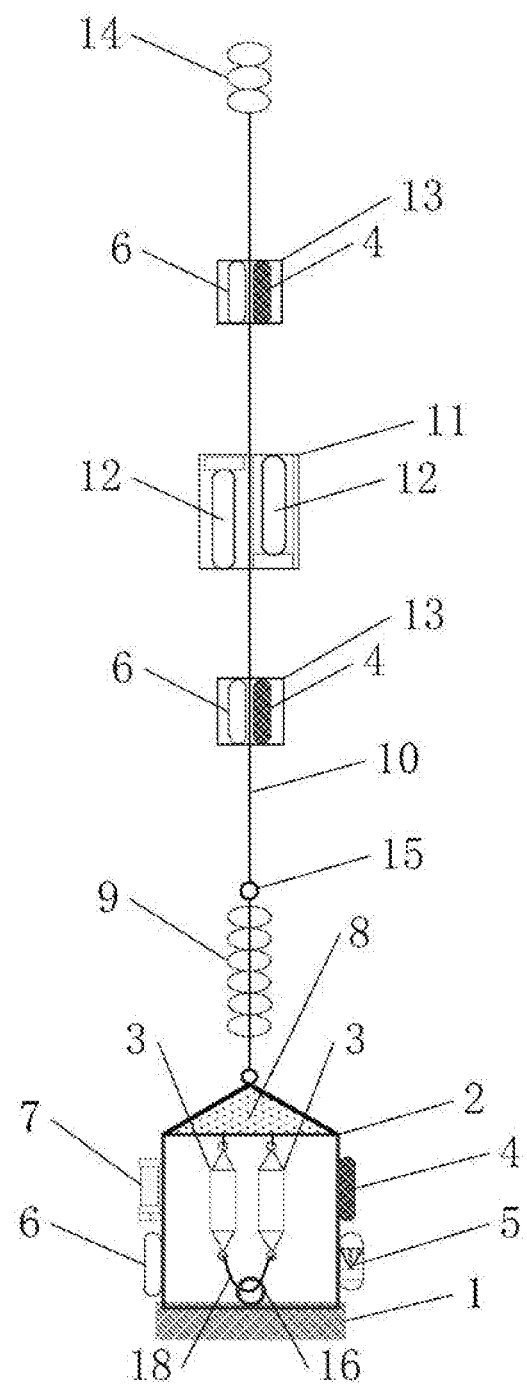
FIG. 1 is an overall structural diagram of an observation system of the invention.
Figure 2:
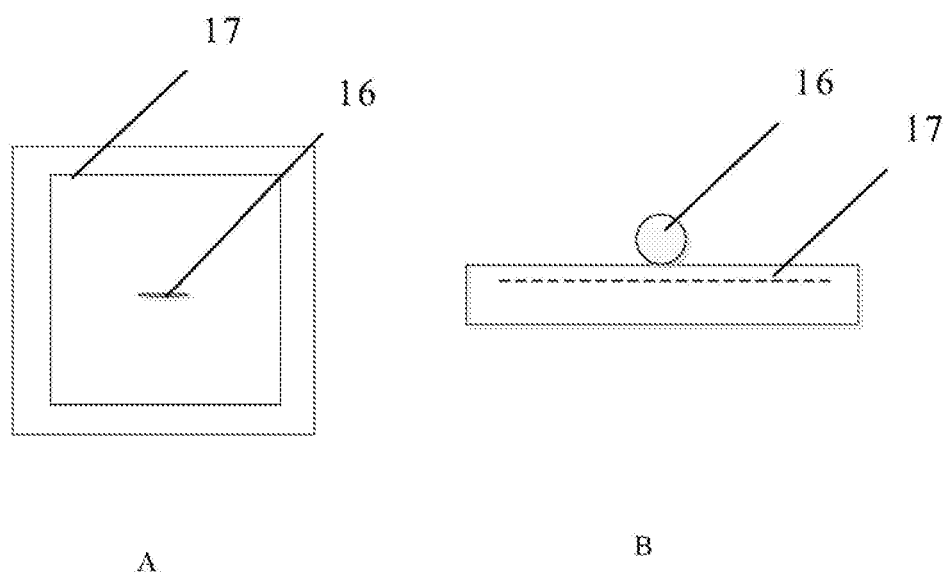
Figure 3:
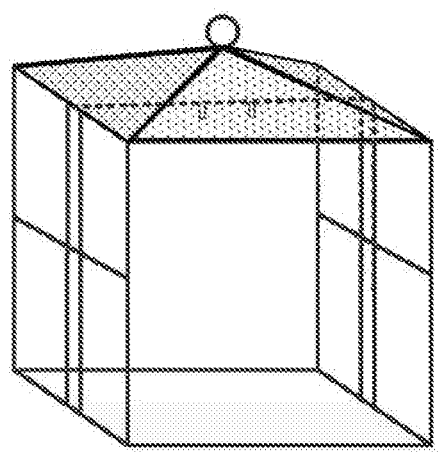
FIG. 3 is a structural diagram of a submarine observation platform.

As shown in FIG. 1-FIG. 3, an observation system for the re-suspension quantity of submarine sediments by deep-sea internal waves comprises a submarine observation platform frame 2 located at the bottom; an anchor mooring counterweight 1 located below the submarine observation platform frame and a mooring rope 10 vertically arranged, wherein the anchor mooring counterweight 1 is a cuboid gravity anchor having a fixed ring 16 arranged in the middle of the upper surface; and floating materials 8 are arranged at the top of the submarine observation platform frame 2; a turbidity meter 4, a sediment catcher 5, a high-precision temperature and salinity detector 6, a single-point current meter 7; and two acoustic release transponders 3 connected in parallel are disposed on the submarine observation platform frame 2; the upper ends of the two acoustic release transponders 3 are connected with the submarine observation platform frame 2, and the lower ends of the two acoustic release transponders 3 are connected through a rope 18 penetrating through the fixed ring 16; the bottom end of the mooring rope 10 is connected with the submarine observation platform frame 2, and the top end of the mooring rope 10 is connected with a first glass floating ball assembly 14; a second glass floating ball assembly 9, a release ring 15, and a main floating body 11 are sequentially arranged on the mooring rope 10 from the bottom end to the first glass floating ball assembly 14 at the top end; and two or more auxiliary floating bodies 13 are mounted at different positions of the mooring rope 10; the main floating body 11 is located in the middle of the mooring rope 10 and is equipped with two acoustic Doppler current profilers 12, wherein one of the two acoustic Doppler current profilers 12 faces upwards and is used for observing a flow field above the main floating body 11, and the other one of the two acoustic Doppler current profilers 12 faces downwards and is used for Observing a flow field below the main floating body 11, so that full-depth flow measurement from the sea surface to the seabed is achieved; a flow measurement layer has a thickness of 8-24 m; each of the auxiliary floating bodies 13 is equipped with a turbidity meter 4 and a high-precision temperature and salinity detector 6, the adjacent auxiliary floating bodies 13 are arrayed at equal intervals, and the distance between the auxiliary floating bodies 13 is not over 20 m.

The main floating body 11 is located in the middle of the mooring rope 10 and comprises a main frame made from 316 stainless steel, wherein a floating material layer is arranged on the outer side of the main frame to provide a static buoyancy force for the system, and two 75 kHz acoustic Doppler current profilers 12 are mounted on the main frame.

Each auxiliary floating body 13 comprises an auxiliary frame made from 316 stainless steel, wherein a floating material layer is arranged on the outer side of the auxiliary frame to provide a static buoyancy force for the system, the turbidity meter 4 and the high-precision temperature and salinity detector 6 are mounted on the auxiliary frame to measure turbidity and salinity data of one point, and one turbidity meter and one high-precision temperature and salinity detector form a set. The number of the auxiliary floating bodies 13 is determined according to the depth (namely the length of the mooring rope 10), and particularly, in the case where the length of the mooring rope 10 reaches 200 m, eleven auxiliary floating bodies 13 are arranged at equal intervals to observe temperature, salinity and turbidity changes within 200 m above the seabed.

The first glass floating ball assembly 14 is arranged at the top end of the mooring rope 10, the second glass floating ball assembly 9 is arranged on the lower portion of the mooring rope 10, the first glass floating ball assembly 14 and the second glass floating ball assembly 9 provide a static buoyancy force for a submersible buoy system as needed, the release ring 15 is arranged on the mooring rope and is located above the second glass floating ball assembly 9, and when the submarine observation platform frame 2 is withdrawn, the second glass floating ball assembly 9 floats upwards to carry the release ring 15 out of seawater. In this way, the submarine observation platform frame 2 can be released and withdrawn conveniently.

A submarine observation platform is arranged on the lower portion of the mooring rope (see FIG. 1-FIG. 3) and is a submarine observation platform frame 2 equipped with two acoustic release transponders 3 connected in parallel, a turbidity meter 4, a sediment catcher 5, a high-precision temperature and salinity detector 6, a single-point current meter 7, and floating materials 8. The submarine observation platform frame is of a modular frame structure made from corrosion-resistant light metal pipes through welding, and observation frames with different characteristics can be formed through assembly and disassembly according to technical requirements for deep seabed observation, so as to form the submarine observation platform. The floating materials 8 are arranged at the top of the submarine observation platform frame to guarantee the descending attitude of the observation system and to provide a static buoyancy force for the system to prevent toppling. The submarine observation platform can measure near-bottom temperature, salinity, turbidity, pressure and three-dimensional flow rate of deep seas.

A submarine observation platform frame 2 is arranged at the bottom end of the mooring rope 10, wherein two acoustic release transponders 3 connected in parallel are fixed to the submarine observation platform frame 2, the submarine observation platform frame 2 is connected with an anchor mooring counterweight 1 through the acoustic release transponders 3 connected in parallel, the anchor mooring counterweight 1 is a cuboid gravity anchor matched with the submarine observation platform frame 2 and having a fixed ring 16 arranged in the middle, and the gravity anchor is inlaid in an observation platform through a square clamping groove 1 to prevent the observation platform from swinging during observation. When the observation system is withdrawn, the gravity anchor and the observation platform are separated. The anchor mooring counterweight 1 is located at the bottom end of the observation system to provide a mooring gravity for the observation system and is equipped with the two acoustic release transponders 3 connected in parallel, and a rope 18 located at the bottom ends of the two acoustic release transponders 3 penetrates through the fixed ring 15 at the top of the anchor mooring counterweight 1, so that separation and release can be completed as long as one acoustic release transponder 3 works normally, and accordingly, reliably recovery of the observation system is ensured.

When the observation system is withdrawn, the anchor mooring counterweight 1 is released by the acoustic release transponders 3, and the whole submarine observation platform frame and observation instruments are separated from the rooming counterweight 1 to be lifted out of seawater by means of a positive buoyancy force generated by a plurality of floating balls and the floating materials to be transferred onto an offshore research vessel through a recovery vessel.

The observation system and determination method for the re-suspension quantity of submarine sediments by deep-sea internal waves can synchronously obtain the full-depth fixed-point data such as the temperature, salinity, pressure, flow rate and flow direction of oceans and parameters such as profile data of the ocean velocity. All measurement instruments involved in the observation system and determination method for the re-suspension quantity of submarine sediments by deep-sea internal waves such as the turbidity meters 4, the sediment catcher 5, the high-precision temperature and salinity detectors 6, the single-point current meter 7, and the acoustic Doppler current profilers 12 are self-contained, which means that measurement data are stored in these measurement instruments first and are read after the observation system is withdrawn.

The determination method for the re-suspension quantity of submarine sediments by deep-sea internal waves mainly comprises: calibrating observation instruments through an indoor calibration test, detecting and setting the observation instruments, loading the observation instruments on an auxiliary vessel which sails to a target position, configuring the observation instruments through an afterdeck hoisting device of the auxiliary vessel, performing observation and recording by the observation instruments according to a set cycle, withdrawing the observation instruments after the in-situ observation cycle is ended, and obtaining the re-suspension quantity of the submarine sediments by deep-sea internal waves through data analysis and calibration.

Figure 4:
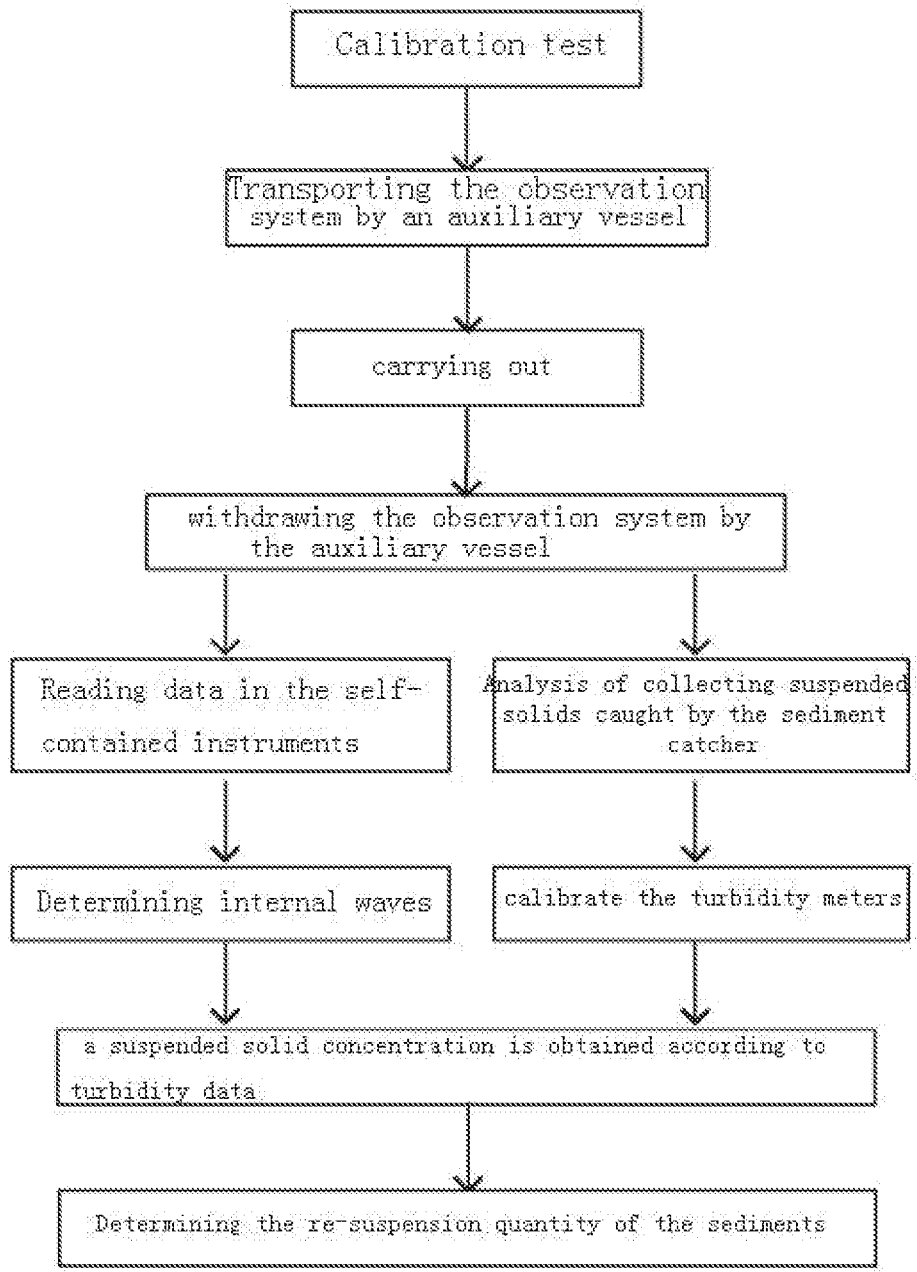
FIG. 4 is a flow diagram of a method of the invention.

The steps of the method in this embodiment are described below with reference to FIG. 4:

(1) All the instruments on the observation system are calibrated indoors, and operating parameters of the instruments are set;

(2) The observation system is transported to a target position by an auxiliary vessel and a GPS positioning system, a hoisting device and a deployment rope on the vessel are prepared, the mooring rope and instruments fixed to the mooring rope are configured first, and then the submarine frame is launched through the release ring 15;

(3) after configuration is completed, observation is carried out by the instruments on the observation system according to the set parameters;

(4) After observation is completed, the observation system is withdrawn by the auxiliary vessel. Particularly; the anchor mooring counterweight 1 is released first through the two acoustic release transponders 3 connected in parallel, so that the submarine observation platform frame 2 is freely separated from the anchor mooring counterweight 1; two acoustic release transponders 3 are arranged, and the rope 18 located at the bottom ends of the two acoustic release transponders 3 penetrates through the fixed ring 15 at the top of the anchor mooring counterweight 1, so that release and separation can be completed as long as one acoustic release transponder 3 works normally, the whole mooring rope 10 and the submarine observation platform frame 2 emerge from seawater under the effect of the floating bodies; afterwards; the submarine observation platform frame 2 emerging from seawater is withdrawn through the release ring 15; and finally, the mooring rope 10 and the instruments fixed to the mooring rope 10 are withdrawn;

(5) Data in the self-contained instruments are read, and suspended solids caught by the sediment catcher are collected;

(6) Organic components in part of the suspended solids caught by the sediment catcher 5 are removed with H202, and the percentage of sediments in the suspended solids is calculated according to the following formula:

$$f = \frac{m_s}{m}$$

Wherein, f is the percentage of the sediments in the suspended solids, ms is the mass of the suspended solids after the organic components are removed, and in is the total mass of the suspended solids;

Afterwards, the granularity of remaining sediments is determined through a Malvin granulometer, and finally, a suspension is prepared from the remaining sediments to calibrate the turbidity meters 4, so that the suspended solid concentration is obtained according to turbidity data;

(7) Internal waves are determined by an analysis of flow rate data and temperature-salinity profile data;

(8) The re-suspension quantity of the sediments by the internal waves is determined according to a calibration result obtained in Step 6 and the internal waves obtained in Step 7;

The re-suspension quantity is calculated according to the following formula:

$$T = f\left[\int_0^{L1}(ssc_1 \times u_1) + \int_{L1}^{L2}(ssc_2 \times u_2) + \int_{L2}^{L3}(ssc_3 \times u_3) + \ldots + \int_{Ln-1}^{Ln}(ssc_n \times u_n)\right]$$

Wherein, T is the re-suspension quantity of the sediments by the internal waves, and f is the percentage of the sediments in all the suspended solids; if the observation system is equipped with n–1 auxiliary floating bodies each comprising one turbidity meter and the submarine platform is provided with one turbidity meter, totally n turbidity meters are configured and are sequentially marked as a 1st turbidity meter, a 2nd turbidity meter and an nth turbidity meter from bottom to top; L1, L2, . . . , and Ln are the heights of the turbidity meters relative to the seabed, and SSC is the suspended solid concentration and is the calibration result obtain in Step 6; due to the fact that multiple auxiliary floating bodies are arranged, data of the suspended solid concentration at the positions of the auxiliary floating bodies are obtained, and the SSC in the height areas of the auxiliary floating bodies is estimated according to the data of the suspended solid concentration at different heights, wherein SSC1 is the average suspended solid concentration from the seabed to the 1st turbidity meter, SSC2 is the average suspended solid concentration from the 1st turbidity meter to the 2nd turbidity meter, and so on; and u1 is a flow field measured by the acoustic Doppler current profilers at the height corresponding to SSC1, u2 is a flow field measured by the acoustic Doppler current profilers at the height corresponding to SSC2, and so on. Please refer to the prior art for relevant technical contents not mentioned in the above embodiment.

What needs to be pointed out is that the above embodiment is only used for explaining the technical solution of the invention, and is not intended to limit the invention. Although the invention is detailed with reference to the above embodiment, modifications of the technical solution recorded in the above embodiment or equivalent substitutes of partial technical characteristics can be achieved by those ordinarily skilled in the art without essentially deviating from the spirit or going beyond the scope of the invention.

What is claimed is:

1. An observation system for the re-suspension quantity of submarine sediments by deep-sea internal waves, comprising:
    a submarine observation platform frame located at a bottom of the system,
    an anchor mooring counterweight located below the submarine observation platform frame, and
    a mooring rope arranged vertically,
    wherein the anchor mooring counterweight is a cuboid gravity anchor provided with a fixed ring in a middle of an upper surface, and floating materials mare arranged at a top of the submarine observation platform frame the submarine observation platform frame is equipped with a turbidity meter, a sediment catcher, a high-precision temperature and salinity detect a single-point current meter and two acoustic release transponders connected in parallel; upper ends of the two acoustic release transponder connected with the submarine observation platform frame, and lower two ends of the two acoustic release transponder are connected through a rope penetrating through the fixed ring; the mooring rope has a bottom end connected with the submarine observation platform frame and a top end connected with a first glass floating ball assembly; a second glass floating ball assembly, a release ring and a main floating body are sequentially arranged on the mooring rope from the bottom end to the first glass floating ball assembly at the top end; two or more auxiliary floating bodies are mounted at different positions of the mooring rope; the main floating body is located in a middle of the mooring rope and is equipped with two acoustic Doppler current profilers, wherein one of the two acoustic Doppler current profilers faces upwards and is configured for observing a flow field above the main floating body, and an other one of the two acoustic Doppler current profilers faces downwards and is configured for observing a flow field below the main floating body, allowing achieving full-depth flow measurement from a sea surface to a seabed; a flow measurement layer has a thickness of 8-24 m; and each said auxiliary floating body is equipped with a turbidity meter and a high-precision temperature and salinity, detector.

2. The observation system for the re-suspension quantity of submarine sediments by deep-sea internal waves according to claim 1, wherein distances between the auxiliary floating bodies are equal to or less than 20 m.

3. A method for obtaining the re-suspension quantity of submarine sediments by deep-sea internal waves through the observation system according to claim 1; comprising the following steps:
    (1) calibrating all instruments on the observation system, and setting operating parameters of the instruments;
    (2) transporting the observation system to a target position by an auxiliary vessel and a GPS positioning system, preparing a hoisting device and a deployment rope on the vessel, configuring the mooring rope and the instruments fixed on the mooring rope, and then launching the submarine observation platform frame through the release ring;
    (3) after configuration is completed, carrying out self-contained observation by the instruments on the observation system according to the set parameters;
    (4) after observation is completed; withdrawing the observation system by the auxiliary vessel particularly as follows: the anchor mooring counterweight is released through the two acoustic release transponders connected in parallel, allowing the submarine observation platform frame to be separated from the anchor mooring counterweight, the mooring rope and the submarine observation platform frame wholly emerge from seawater under the effect of the floating bodies, afterwards, the submarine observation platform frame emerging from the seawater is withdrawn through the release ring, and finally, the mooring rope and the instruments fixed to the mooring rope are recovered;
    (5) reading data in the self-contained instruments, and collecting suspended solids caught by the sediment catcher;
    (6) removing organic components in part of the suspended solids caught by the sediment catcher with $H_2O_2$, and calculating the percentage of sediments in all the suspended solids according to the following formula:

$$f = \frac{m_s}{m}$$

wherein, f is the percentage of the sediments in the suspended solids, ms is the mass of the suspended solids after the organic components are removed, and in is the total mass of the suspended solids;
    afterwards, determining the granularity of remaining sediments through a Malvin granulometer, and finally, preparing a suspension with the remaining sediments to calibrate the turbidity meters to obtain a suspended solid concentration according to turbidity data;
    (7) determining internal waves by an analysis of flow rate data and temperature-salinity profile data;
    (8) determining the re-suspension quantity of the sediments by the internal waves according to a calibration result obtained in the Step 6 and the internal waves obtained in the Step 7;

the re-suspension quantity is calculated according to the following formula:

$$T = f\left[\int_0^{L1}(ssc_1 \times u_1) + \int_{L1}^{L2}(ssc_2 \times u_2) + \int_{L2}^{L3}(ssc_3 \times u_3) + \ldots + \int_{Ln-1}^{Ln}(ssc_n \times u_n)\right]$$

wherein, T is the re-suspension quantity of the sediments by the internal waves, and f is the percentage of the sediments in all the suspended solids; if the observation system is equipped with n−1 auxiliary floating bodies each comprising one turbidity meter and the submarine platform is provided with one turbidity meter, totally n turbidity meters are configured and are sequentially marked as a 1st turbidity meter, a 2nd turbidity meter and an nth turbidity meter from bottom to top; L1, L2, . . . , and Ln are heights of the turbidity meters relative to the seabed; SSC1 is an average suspended solid concentration from the seabed to the 1st turbidity meter, SSC2 is an average suspended solid concentration from the 1st turbidity meter to the 2nd turbidity meter, and so on; and u1 is a flow field measured by the acoustic Doppler current profilers at the height corresponding to SSC1, u2 is a flow field measured by the acoustic Doppler current profilers at the height corresponding to SSC2, . . . , and so on.

* * * * *